Sept. 6, 1960  B. S. BERNHARD  2,951,723
HOLD-OPEN DEVICE
Filed July 1, 1957

INVENTOR.
BENJAMIN S. BERNHARD.
BY Louis V. Lucia
ATTORNEY.

United States Patent Office 2,951,723
Patented Sept. 6, 1960

2,951,723
HOLD-OPEN DEVICE

Benjamin S. Bernhard, New Britain, Conn., assignor to The American Hardware Corporation, New Britain, Conn., a corporation of Connecticut Filed July 1, 1957, Ser. No. 669,310

2 Claims. (Cl. 292—275)

This invention relates to a hold-open device for doors and more particularly to such a device which is combined with conventional door closers for holding the door open.

The present invention is particularly intended for the type of devices employing a screw member which is tightened, when the door is opened to a required distance, so as to cause a binding action which will frictionally hold the door in open position.

In devices of this type, it is extremely important that the screw member be adjustable to a precise position so that the required amount of binding action will be attained when the door is opened to a predetermined position. Also, it is important that the said screw member be adjustable in order to take up wear in the frictional surfaces of the device.

It is an object of the present invention, therefore, to provide for such devices means for selectively adjusting and securing the screw member in adjusted positions so as to attain maximum efficiency in the operation of the device for holding a door open at a predetermined position.

A further object of this invention is the provision of adjusting and securing means whereby a large number of positions for the screw member are selectively available and the said screw member may be positively locked in a position that is extremely close to the position of maximum efficiency.

Further objects and advantages of this invention will be more clearly understood from the following description and the accompanying drawing in which.

Figure 1:
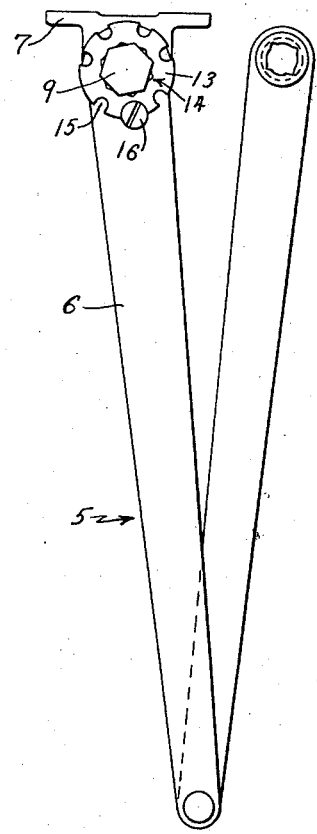
Fig. 1 is a plan view of a hold-open device embodying the present invention.
Figure 2:
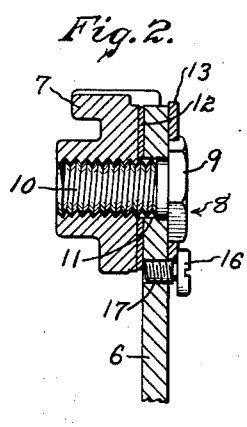
Fig. 2 is an enlarged sectional view on line 2—2 of Fig. 3.
Figure 3:
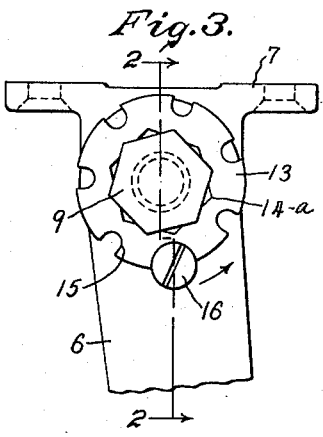
Fig. 3 is an enlarged plan view of a portion of said device.
Figure 4:
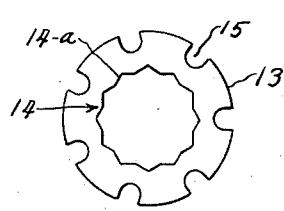
Fig. 4 is a plan view of the lock member used in the present invention.

As illustrated in the drawings, the numeral 5 denotes a connecting arm and bracket assembly for a conventional door closer which includes an arm 6 that is rotatably connected to a bracket 7 by means of a screw member 8. Said screw member has a polygonal head 9, which overlies the arm 6, and a threaded shank 10 that extends through a hole 11 in the said arm and is threaded to the bracket 7. A friction disc 12 is preferably provided between the arm 6 and the surface of the said bracket 7.

The screw 8 is secured to the arm 6 and rotates therewith so that, when the arm 6 is rotated in one direction relatively to the bracket 7, said screw will rotate in the bracket 7 and thereby tighten the arm on the bracket and frictionally bind the arm 6 to the said bracket.

In the device shown, when a door is opened, the arm 6 will rotate in a counterclockwise direction. The screw 8 is provided with a left-hand thread so that it will move into the hole 11 as the door is opened and will clamp the said arm to the bracket to frictionally hold the door open against the force of the door closer when the door has reached the predetermined position for which the said screw is adjusted.

The present invention provides a locking member in the form of a washer 13 having a hole 14 therein which is formed with a plurality of notches 14-a that conform with the shape of the screw head 9 and are adapted to receive said head in at least twice the number of positions as the number of sides on the said head. In the embodiment shown, the said head 9 is hexagonal in shape and therefore has six points projecting therefrom. The hole 14 conforms with the shape of said screw head, but has twelve notches therein which receive the six points of the head and prevent rotation of the screw relatively to the arm 6. Therefore, it will be understood that with the washer 13 in one position, the screw can be adjusted and locked to the arm 6 by said washer in twelve different positions about its axis.

In addition to the notches 14-a, which are of an even number, I provide the said washer with an odd number of notches 15 in the periphery thereof, each of which is adapted to receive the shank of a locking screw 16 that is threaded into a hole 17 in the arm 6 and has a head engaging the upper surface of the washer.

In adjusting the screw 8 for holding the door open in a desired position, the locking washer 13 is first removed and the screw 8 is rotated until it is adjusted so that the required force is applied between the arm 6 and the bracket 7 to hold the door in the open position. The said screw 8 is then secured in the adjusted position by placing the locking washer over the screw head in the position where the said screw head is received in the six conforming notches 14-a and one of the notches 15 is in register with the hole 17 in the arm 6. The screw 16 is then inserted into said hole for securing the said washer to the arm 6 and thereby retaining the screw 8 in adjusted position.

In the event that one of the notches 15 does not register with the hole 17 when the locking washer is first placed over the head of the screw 8, the said washer may be tried in different positions on the screw head until the one notch 15 which will register with said hole is found and the screw 16 is then inserted.

It will be noted that since there are twelve notches 14-a around the hole 14 of the locking washer, and seven notches 15 in its periphery, there are provided eighty-four different positions in which the screw 8 can be locked to the arm 6, or approximately a locking position for each four and a half degrees of rotation so that there is a position for locking the screw to the arm within two and a quarter degrees of any position in which it may be adjusted to obtain the required pressure between the arm 6 and the bracket 7.

It will be understood that the number of positions provided for the screw head in the hole 14 and the number of notches 15 may vary, if desired, provided that the number of notches in the hole 14 is an even number and the number of notches 15 in the washer 13 is an odd number, or vice versa; the number of adjustments attainable for the screw 8 depending upon the number of such positions and notches provided.

I claim:

1. A hold-open device comprising a bracket, an arm, a screw having a threaded shank extending through an opening in said arm and threaded to said bracket whereby said arm is adapted to rotate relatively to said bracket, said screw having a head overlying said arm and provided with a plurality of circum-axially spaced projections, an annular locking washer having a plurality of circum-axially spaced recesses therein conforming to said projections whereby said washer is adapted to be non-rotatably attached to said screw head in a plurality of different angular positions, said locking washer also having a plurality of spaced openings therein disposed concentrically of and surrounding said recesses, and a securing member attached to said arm and adapted to be received in one of said openings in the locking washer whereby to lock said washer and the screw to said arm for rotation therewith relative to said bracket, the plurality of recesses and plurality of openings in said locking washer being unequal in number and only one of said plurality corresponding to a prime number to permit control of the angular disposition of said arm relative to said bracket in predetermined angular increments of adjustment.

2. A hold-open device comprising a bracket, an arm, a screw having a threaded shank extending through an opening in said arm and threaded to said bracket whereby said arm is adapted to rotate relatively to said bracket, a head on said screw overlying said arm, said head being of polygonal shape including a plurality of equally spaced corners, a locking washer having an axial opening therein provided with a series of spaced recesses in the edge of said opening adapted to receive said corners whereby said washer is attachable to said screw head in a plurality of different angular positions, said locking washer also having a series of equally spaced notches in its outer periphery, and a securing screw threaded to said arm and receivable in one of said notches aligned therewith whereby to lock said washer and the first mentioned screw to said arm for rotation therewith relative to said bracket, the series of recesses and the series of notches in said locking washer being unequal in number and only one of said series corresponding to a prime number to permit control of the angular disposition of said arm relative to said bracket in known angular increments of adjustment.

References Cited in the file of this patent
UNITED STATES PATENTS

| | | |
|---|---|---|
| 1,229,783 | Pogue | June 12, 1917 |
| 1,275,980 | Norton | Aug. 13, 1918 |
| 1,472,920 | Lane | Nov. 6, 1923 |
| 2,426,219 | Jackson | Aug. 26, 1947 |
| 2,668,730 | De Vito | Feb. 9, 1954 |